United States Patent
Maruyama et al.

[19]

[11] Patent Number: 5,916,520

[45] Date of Patent: Jun. 29, 1999

[54] BRAZING FILLERS FOR SEALING VACUUM-TIGHT VESSELS, VACUUM-TIGHT VESSELS AND METHOD FOR MANUFACTURING VACUUM-TIGHT VESSELS

[75] Inventors: Miho Maruyama, Yokohama; Masako Nakahashi, Tokyo; Kiyoshi Osabe, Kanagawa-ken; Rika Takigawa, Tokorozawa; Shoji Niwa, Sagamihara, all of Japan

[73] Assignee: Kabushiki Kaisha Toshiba, Kawasaki, Japan

[21] Appl. No.: 08/814,360

[22] Filed: Mar. 11, 1997

[30] Foreign Application Priority Data

Mar. 12, 1996 [JP] Japan .................................. 8-054763

[51] Int. Cl.$^6$ ........................................................ C22C 9/00
[52] U.S. Cl. ........................... 420/492; 420/497; 420/502; 420/590
[58] Field of Search .................................... 420/492, 497, 420/502, 590

[56] References Cited

U.S. PATENT DOCUMENTS 4,883,217  11/1989  Dunn et al. ............................ 228/122
4,917,642   4/1990  Nakahashi et al. ...................... 445/44
5,407,119   4/1995  Churchill et al. .................... 228/124.5

FOREIGN PATENT DOCUMENTS 61-82996   4/1986   Japan .

OTHER PUBLICATIONS

Howard Mizuhara, et al., "High–Reliability Joining of Ceramic to Metal", Ceramic Bulletin, vol. 68, No. 9, 1989, pp. 1591–1599.

Primary Examiner—Jose' G. Dees
Assistant Examiner—Michael A. Williamson
Attorney, Agent, or Firm—Oblon, Spivak, McClelland, Maier, & Neustadt, P.C.

[57] ABSTRACT

The brazing filler of the present invention is excellent in wetting properties towards the open end of a ceramic cylinder and a metal sealing cap can be sealed well on the open end. The present brazing filler comprises Ag, Cu and active metal, in which the Cu-active metal compound is contained in an amount of not more than 40% by volume.

15 Claims, 3 Drawing Sheets

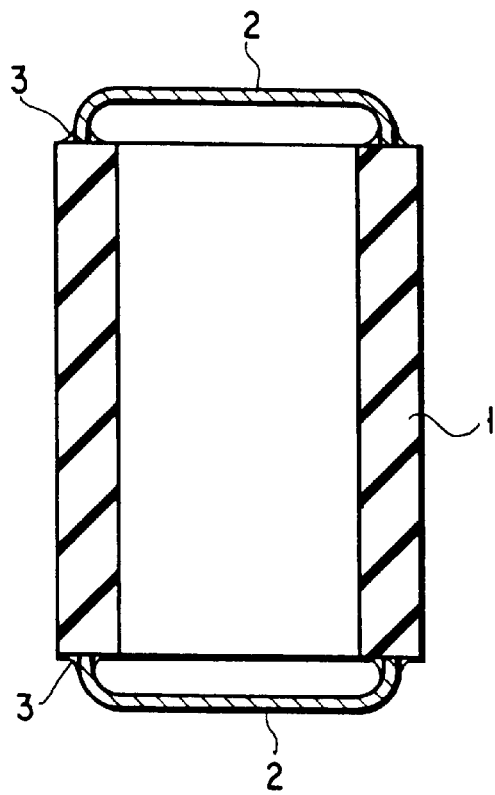
F I G. 2
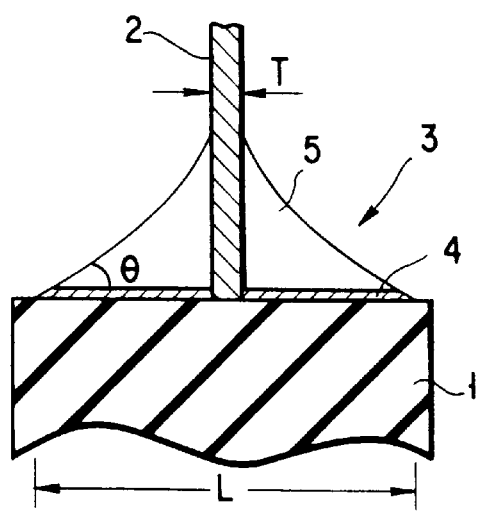
F I G. 3
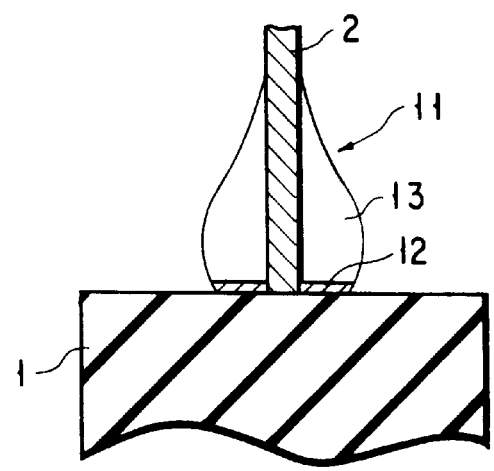
F I G. 5

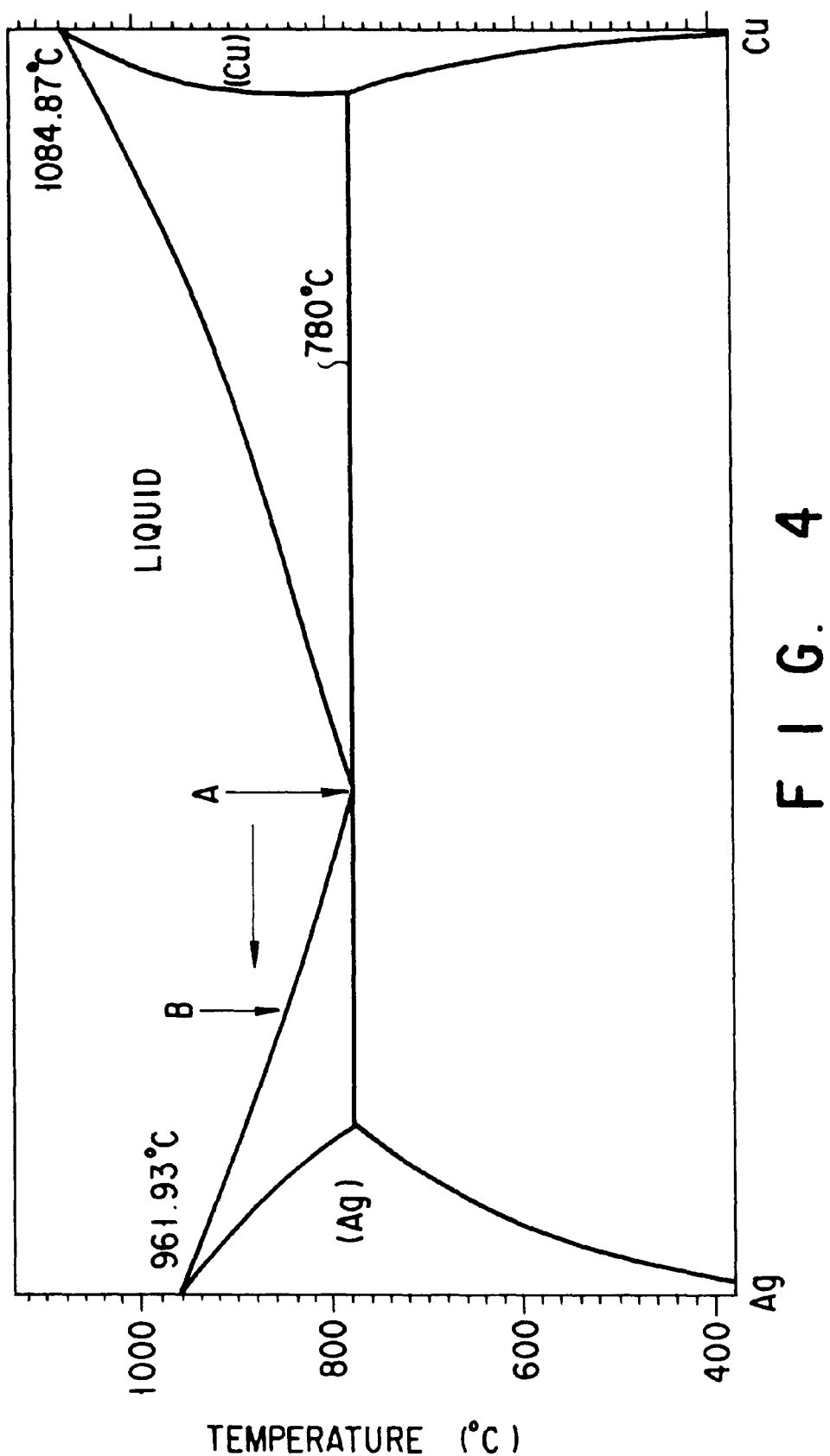
F I G. 4

BRAZING FILLERS FOR SEALING VACUUM-TIGHT VESSELS, VACUUM-TIGHT VESSELS AND METHOD FOR MANUFACTURING VACUUM-TIGHT VESSELS

BACKGROUND OF THE INVENTION

The present invention relates to a brazing filler for sealing vacuum-tight vessels, vacuum-tight vessels and a method for manufacturing vacuum-tight vessels.

The vacuum-tight vessels used in vacuum valves, thyristor etc. are manufactured by sealing the open end of a ceramic cylinder with a sealing metal cap to maintain vacuum-tight conditions inside the vessels.

Conventionally, such vacuum-tight vessels have been manufactured by placing a Mo—Mn metallized layer between the open end of a ceramic cylinder and a metal sealing cap and then sealing the cylinder with the sealing cap by heating. However, this method is problematic in that the step of producing the Mo—Mn metallized layer is complicated and thermal treatment at high temperature is required for sealing.

Under these circumstances, an active metal method has been investigated as a sealing method as a substitute for the method using the Mo—Mn metallized layer. A brazing filler consisting of active metal is generally a filler containing 3 elements of Ag, Cu, and Ti. Japanese Patent Publication No. 1216/1960 discloses that ceramic and metal are joined via a brazing filler prepared by adding Ti to an eutectic composition of Ag—Cu. However, if such brazing filler consisting of active metal is placed between the open end of the ceramic cylinder and the metal sealing cap and heated at the melting point of the brazing filler, the whole of the brazing filler is melted all at once. As a result, the brazing material cannot demonstrate sufficient wetting properties towards the cylinder and thus it was difficult to seal the open end of the cylinder with the metal sealing cap.

BRIEF SUMMARY OF THE INVENTION

An object of the present invention is to provide a brazing filler for sealing vacuum-tight vessels, which is excellent in wetting properties towards the open end of a ceramic cylinder.

Another object of the present invention is to provide a vacuum-tight vessel comprising a ceramic cylinder having the open ends strongly sealed with two metal sealing caps, respectively, by each long-legged sealing layer having a segregated layer, made of an active metal, formed on the surface of the open end.

A further object of the present invention is to provide a method for manufacturing a vacuum-tight vessel, comprising a ceramic cylinder and two metal sealing caps to permit the open ends of the ceramic cylinder to be sealed strongly with the sealing caps, respectively, by thermal treatment at a relatively low temperature with two brazing fillers each having excellent in wetting properties towards the ceramic cylinder.

According to the present invention, there is provided a brazing filler comprising Ag, Cu and active metal, in which the Cu-active metal compound in contained in an amount of not more than 40% by volume.

According to the present invention, there is further provided a vacuum-tight vessel, comprising:

a cylinder made of ceramic;

two sealing caps, each having a frame-shaped end, arranged on the open ends of the cylinder to seal the open end of the cylinder; and two sealing layers for pastening the frame-shaped ends to the open ends of the cylinder, respectively, each sealing layer constituting of:

(a) segregated layer, made of an active metal, formed at the open end, and an Ag—Cu based main body protruded from the segregated layer to the frame-shaped end of the sealing cap, and being defined by:

(b) L≧4 T, and θ≦60°, wherein L does not exceed the width of the open end, and being the minimum length spreading on the surface of the open end; T is the thickness of the frame-shaped end of the sealing cap; and θ is the angle to the surface of the open end.

According to the present invention, there is further provided a method for manufacturing a vacuum-tight vessel, comprising the steps of:

preparing two sealing caps made of metal, each having frame-shaped end;

arranging the sealing caps to place each frame-shaped end of the sealing caps on the open ends of a cylinder made of ceramic, respectively;

inserting two brazing fillers, composed of an Ag—Cu-active metal in which the Cu-active metal compound is contained in an amount of not more than 40% by volume, between the open ends of the cylinder and the frame-shape ends, respectively; and subjecting the brazing fillers to thermal treatment at a temperature exceeding an Ag—Cu eutectic temperature until two segregated layers, made of an active metal, are formed on the surfaces of the open ends of the cylinder in contact with the brazing fillers, respectively, thereby closing the open ends of the cylinder.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view of the vacuum-tight vessel according to the present invention.

FIG. 3 is a sectional enlargement view of the vicinity of the sealing layer of the vacuum-tight vessel in FIG. 2.

FIG. 4 is a phase diagram for explaining elevation of the melting point of the Ag—Cu—Ti type brazing filler according to the present invention.

FIG. 5 is a sectional enlargement view of the vicinity of the sealing layer of the vacuum-tight vessel in Comparative Example 1.

DETAILED DESCRIPTION OF THE INVENTION

Figure 1:
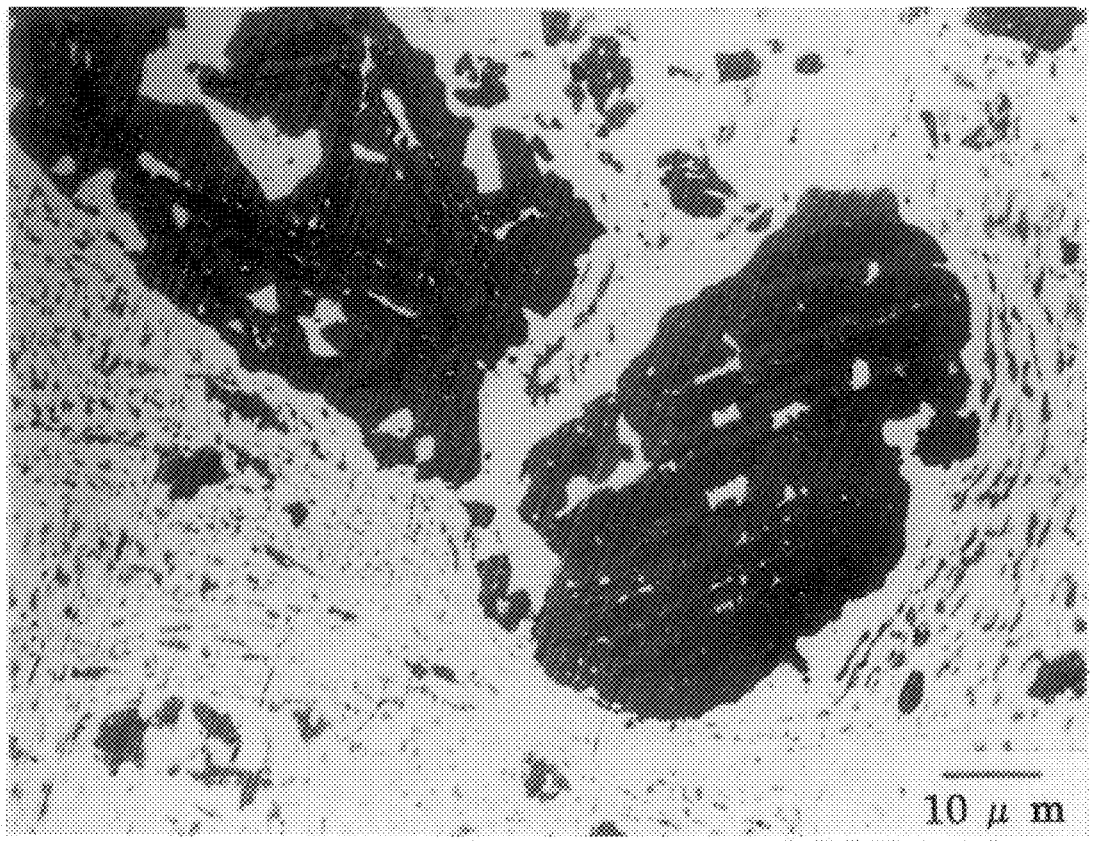
FIG. 1 is an electron microscope photograph showing the structure of the brazing filler for sealing a vacuum-tight vessel according to the present invention.

Hereinafter, the brazing filler for sealing vacuum-tight vessels according to the present invention is described in detail.

This sealing brazing filler comprises Ag—Cu-active metal, in which the Cu-active metal compound is contained in an amount of not more than 40% by volume.

Examples of the active metal are Ti, Zr and Hf. Among these active metals, Ti is particularly preferred.

In a sealing brazing filler containing Ti as the active metal, a Cu—Ti compound shown to be a bulk material in e.g. the electron microscope photograph in FIG. 1 is dispersed in Ag and Cu shown to be finely pieces.

Examples of the Cu—Ti compound containing Ti as the active metal are CuTi, $Cu_3Ti$, $Cu_4Ti$, $Cu_3Ti_2$, and $Cu_4Ti_3$. A high content of Cu such as $Cu_4Ti$ or a mixture of $Cu_4Ti$ and other Cu—Ti compounds are preferably used. As compared with an Ag—Cu eutectic type brazing filler, such brazing filler containing $Cu_4Ti$ effectively elevates its melting temperature at the time of thermal treatment described below, thus permitting the formation of unmelted material contributing to wetting properties in the melting step.

Examples of the Cu—Zr compound containing Zr as the active metal are $CuZr_2$, CuZr, $Cu_3Zr_1$, and $Cu_3Zr$.

Examples of the Cu—Hf compound containing Hf as the active metal are CuHf, $Cu_{10}Hf_7$, $Cu_8Hf_3$, $Cu_{51}Hf_{14}$, and $Cu_5Hf$.

If the content of the Cu-active metal compound in the brazing filler exceeds 40% by volume, the Cu-active metal compound is easily retained in the sealing layer formed from the brazing filler, possibly resulting in formation of shrink mark voids capable of acting as leak passages. The lower limit of the content of the Cu-active metal compound is preferably 3% by volume in view of the formation of a sufficient amount of the unmelted material contributing to the wetting properties of the brazing filler at the time of thermal treatment in the melting step. The content of the Cu-active metal compound in the brazing filler is more preferably 5 to 25% by volume. The brazing filler containing the Cu-active metal compound in this range possesses further improved wetting properties towards the open end of the ceramic cylinder.

The ratio of Ag:Cu: active metal in the composition of the brazing filler is preferably 50–59:33–40:1–17 in molar ratio.

The ratio of Ag:Cu in the composition of the brazing filler is preferably made similar to that of the eutectic composition. The brazing filler with such composition can form a fine eutectic structure in the sealing layer after thermal treatment.

From the viewpoint that the active metal in the brazing filler forms the unmelted material contributing to wetting properties in the melting step by elevating the melting temperature of the brazing filler, the active metal is preferably existed in the form of Cu compound as a whole. However, the active metal may be partially existed in the form of the single active metal element. The active metal is contained preferably in an amount of 3 to 17 mol % in the brazing filler.

The vacuum-tight vessel according to the present invention is described in detail by reference to FIGS. 2 and 3.

FIG. 2 is a sectional view of the vacuum-tight vessel of the present invention, and FIG. 3 is a sectional enlargement view of a sealing layer between a cylinder and a sealing cap in FIG. 2. Two sealing caps 2 each have a frame-shaped end. Each frame-shaped end of the sealing caps 2 is placed on the open ends of a ceramic cylinder 1, respectively. Two sealing layers 3 are pastened each frame-shaped end of the sealing caps 2 to the open ends of the cylinder 1, respectively. Therefore, the open ends of the cylinder 1 are closed by the sealing caps 2, respectively.

As shown in FIG. 3, each sealing layer 3 constitutes of a segregated active metal layer 4 formed at the side of the open end of the cylinder 1, and an Ag—Cu based main body 5 protruded from the segregated layer 4 to the side of the frame-shaped end of the sealing cap 2. As shown in FIG. 3, the sealing layer 3 is defined by the following relationships: $L \geq 4T$, and $\theta \leq 60°$, wherein L does not exceed the width of the open end, and being the minimum length spreading on the surface of the open end of the cylinder 1; T is the thickness of the frame-shaped end of the sealing cap 2; and θ is the angle to the surface of the open end.

The cylinder 1 is made of ceramic such as alumina, silicon nitride or the like.

The sealing cap 2 is made of metal such as stainless steel, iron-nickel alloy or the like.

The segregated layer 4 refers to a layer on which at least 30 mol % active metal is precipitated. The thickness of the segregated layer 4 is preferably 50 nm or more. If the thickness of the segregated layer is less than 50 nm, it would be difficult to form a sealing layer having excellent in wetting properties towards the open end of the cylinder. The thickness of the segregated layer is more preferably in the range of 50 nm to 10 μm.

In the Ag—Cu based main body 5, the content of Ag and Cu is not less than 70 mol %. The main body 5 may further contain inevitable impurities such as active metal and oxygen as components other than Ag and Cu. It is particularly preferred that Ag and Cu in the main body 5 are present substantially in the form of Ag—Cu eutectic alloy.

The reason that the shape of the sealing layer 3 is defined by the minimum length L spreading on the surface of the open end and by the angle θ to the surface of the open end is as follows.

If L is less than 4 T, it would be hard to sufficiently seal the cylinder 1 with the cylinder cap 2 via the sealing layer 3. L is more preferably not less than 5 T.

If θ exceeds 60°, the long-legged property of the sealing layer 3 would be deteriorated and it would be difficult to sufficiently seal the cylinder 1 with the sealing cap 2. θ is more preferably in the range of 5 to 60°.

Hereinafter, the method for manufacturing a vacuum-tight vessel according to the present invention is described in detail.

First, two metal sealing caps, each having a frame-shaped end, are prepared. Each frame-shaped end of the metal sealing caps is placed on the open ends of a ceramic cylinder, respectively. Two sealing brazing fillers are inserted between the open ends of the cylinder and the frame-shaped ends, respectively. Each brazing filler is composed of Ag, Cu, and the active metal in which the Cu-active metal compound is contained in an amount of not more than 40% by volume. Each brazing filler is then subjected to thermal treatment at a temperature higher than the Ag—Cu eutectic temperature until the segregated layers, made of an active metal, are formed on the surfaces of the open ends of the cylinder in contact with each brazing filler, respectively. The vacuum-tight vessels shown in FIGS. 2 and 3 are thus manufactured.

The cylinder is made of ceramic such as alumina, silicon nitride or the like. The sealing cap is made of metal such as stainless steel, iron-nickel alloy or the like.

The brazing filler is used in the form of a thin plate or powder.

Examples of the active metal in the sealing brazing filler are Ti, Zr and Hf.

The Cu-active metal compound used above is the same as described for the sealing brazing filler.

The reason for the definition of the amount of the Cu-active metal compound in the sealing brazing filler is the same as described for the above brazing filler. The amount of the Cu-active metal compound in the brazing filler is more preferably in the range of 5 to 25% by volume.

The ratio of Ag:Cu: active metal in the composition of the sealing brazing filler is preferably 50–59:33–40:1–17 in molar ratio.

The temperature for the above thermal treatment is selected to achieve the optimum with respect to the relationship with the Ag and Cu composition in the sealing brazing filler and is set at the temperature at which the Ag—Cu phase except for the segregated layer is finally completely melted. If the temperature for thermal treatment is set too high, the Cu-active metal compound is melted simultaneously with other components at the initial stage of heating and the effect of incorporating the Cu-active metal compound into the brazing filler cannot be demonstrated sufficiently. For example, if the brazing filler composed of 57.7 mol % Ag, 38.5 mol % Cu, and 3.8 mol % Ti, in which the whole of Ti is in the form of $Cu_4Ti$ is used, the thermal treatment is carried out preferably at about 780 to 880° C. because the Ag—Cu eutectic temperature is 780° C.

In this thermal treatment, it is preferred to incorporate the whole of the Cu-active metal compound by melting into the melted brazing filler after the formation of the segregated layer. By such thermal treatment, it is possible to suppress the formation of shrink mark voids capable of acting as leak passages in the sealing layer.

The thermal treatment is preferably carried out in an atmosphere of an inert gas such as argon, or under vacuum.

The above-described sealing brazing filler according to the present invention comprises an Ag—Cu-active metal in which a Cu-active metal compound is contained in an amount of not more than 40% by volume. The sealing brazing filler begins to melt when the Ag—Cu eutectic temperature is reached. Since the melting temperature of the Cu-active metal compound is high and the dissolution rate is low, the Cu-active metal compound will remain in the solid phase at the initial melting stage of the brazing filler. If the Cu-active metal compound remains in the solid phase in said brazing filler, apparent decrease of Cu will occur in the brazing filler composition at the initial melting stage, resulting in elevation of the Ag content. Thus, the melting temperature of the brazing filler will increase apparently over a certain range. For example, the Cu—Ti compound remains in the solid phase in e.g. a brazing filler consisting of Ag—Cu—Ti in which the Cu—Ti compound is contained in an amount of not more than 40% by volume, and the apparent decrease of Cu in the brazing filler will occur and the Ag content will be raised at the initial melting stage. As a result, as shown in the Ag—Cu phase diagram in FIG. 4, the point A of the Ag—Cu eutectic temperature (780° C.) is shifted to the point B at which both the Ag content and melting temperature are high, and the brazing filler comes to have a melting temperature in the range of A to B.

When such brazing filler is provided between the open end of the ceramic cylinder and the metal sealing cap having a frame-shaped end and subjected to thermal treatment at a temperature exceeding the Ag—Cu eutectic temperature, the brazing filler will not melt all at once, and a part of the brazing filler will be present in the form of unmelted material. The unmelted brazing filler suppresses the formation of the melt brazing filler exceedingly climbed up the side of the frame-shaped end of the sealing cap, thus permitting the melt to be kept at the side of the surface of the open end of the cylinder. When the melted brazing filler is maintained at the side of the surface of the open end of the ceramic cylinder, Cu-active metal, or Cu-active metal and free active metal, will be precipitated on the interface to form a segregated layer of the active metal. When the segregated layer is formed on the surface of the open end of the cylinder, the brazing filler will spread well on the segregated layer, while in the process of forming the segregated layer, the Cu-active metal compound will be dissolved into the brazing filler dissolved at a certain rate.

When the Cu-active metal compound has been melted, the composition of the melted brazing filler has a high content of Cu, and finally the Ag and Cu composition will return to the state before the thermal treatment. The melting point of such composition is lower than the apparent melting point at the above initial melting stage. For this reason, elevation of the solidification point is prevented, and unlike the initial melting stage, the melted brazing filler is solidified all at once in the cooling step after the thermal treatment.

Therefore, two long-legged sealing layers 3 shown in FIGS. 2 and 3 can be formed between the open ends of the ceramic cylinder 1 and each frame-shaped end of the metal sealing caps 2, respectively, by use of the brazing filler with the above composition. In addition, two segregated layers 4 made of an active metal can simultaneously be formed at the surfaces of the open ends of the cylinder 1, respectively. Therefore, a vacuum-tight vessel having the open ends of the cylinder 1 respectively sealed strongly and air-tightly with each frame-shaped end of the sealing caps 2 can be obtained.

Because in the cooling step of forming the sealing layer, the brazing filler can be solidified all at once by preventing the elevation of its solidification point, a sealing layer excellent in sealing properties can be formed in the absence of shrink mark voids capable of serving as leak passages. In particular, when a brazing filler containing Ag—Cu in the Ag—Cu eutectic alloy composition is used, a sealing layer having a uniform and fine structure without departure by melting in the subsequent cooling step can be formed between the open end of the cylinder 1 and the frame-shaped end of the sealing cap 2. As a result, the vacuum-tight vessel which surely prevents the formation of leak passages in the sealing layer can be produced.

As shown in FIGS. 2 and 3, a vacuum-tight vessel according to the present invention comprises a ceramic cylinder 1 and two metal sealing caps 2 each having a frame-shaped end. Each frame-shaped end of the metal sealing caps 2 are placed on the open ends of the cylinder 1, respectively. Two sealing layers 3 are pastened each frame-shaped end to the open ends of the cylinder 1, respectively. As shown in FIG. 3, each sealing layer 3 constitutes of the segregated layer 4, made of an active metal, formed at the open end of the cylinder 1, and the Ag—Cu based main body 5 protruded from the segregated layer 4 to the frame-shaped end of the sealing cap 2 as shown in FIG. 3. Each sealing layer 3 is defined by the following relationships: $L \geq 4T$, and $\theta \leq 60°$, wherein L does not exceed the width of the open end, and being the minimum length spreading on the surface of the open end of the cylinder 11; T is the thickness of the frame-shaped end of the sealing cap 12; and θ is the angle to the surface of the open end.

Two long-legged sealing layers, defined by L and θ, pasten each frame-shaped end of the sealing caps 2 to the open ends of the cylinder 1, respectively, and each have the segregated layer 4 made of an active metal contacted with the surface of the open end of the cylinder 1. Therefore, a vacuum-tight vessel, comprising the cylinder 1 having the open ends sealed strongly and air-tightly with the frame-shaped ends of the sealing caps 2, respectively, can be realized.

In addition, the vacuum-tight vessel excellent hermetic properties surely preventing leak passages in the sealing layer, can be realized by forming the main body 5 constituting each sealing layer 3 from the Ag—Cu eutectic alloy having a fine eutectic structure.

The present invention is described in more detail by reference to the following preferred examples.

EXAMPLE 1

First, a melt composed of 57.7 mol % Ag, 38.5 mol % Cu, and 3.8 mol % Ti was prepared and cooled gradually in a desired mold to form a ring-shaped brazing filler having 39 mm in outer diameter, 38.5 mm in inner diameter, and 0.2 mm in thickness, containing the whole of Ti substantially in the form of $Cu_4Ti$. The volume ratio of $Cu_4Ti$ in this brazing filler was 27% as determined by evaluation of its section. Note that, the ring-shaped brazing filler may be formed by punching a plate consisting of the metal component.

Then, two sealing caps made of SUS 304 and each having circle-shaped end, and 0.5 mm in thickness, 39 mm in outer diameter, and 5 mm in height were prepared. In addition, a cylinder made of 94% purity alumina and having 44 mm in outer diameter, 39 mm in inner diameter, and 52 mm in height was prepared. Subsequently, each circle-shaped end of the sealing caps was placed on the open ends of the cylinder, respectively. Each ring-shaped brazing filler obtained above method was inserted between the open ends of the cylinder and the circle-shaped ends, respectively. Resultant members were introduced into a vacuum furnace which was then evacuated to $6 \times 10^{-4}$ Pa, and the temperature was raised to 810° C. at a raising rate of 327° C./hour, and this temperature was kept for 20 minutes, and then the specimen was cooled in the furnace, to manufacture a vacuum-tight vessel comprising the cylinder having the open ends sealed with each circle-shaped end of the sealing caps by each sealing layer, respectively.

COMPARATIVE EXAMPLE 1

A vacuum-tight vessel was manufactured in the same manner as in Example 1 except that two laminates prepared by laminating Ag, Cu and Ti foils in the same composition as in Example 1 was used as the sealing brazing filler and each laminate was arranged such that the Ti foil was positioned at the open ends of the cylinder, respectively.

COMPARATIVE EXAMPLE 2

A vacuum-tight vessel was manufactured in the same manner as in Example 1 except that the same composition of Ag, Cu and Ti as in Example 1 was used in amorphous states. The form of Ti present in the amorphous states in the brazing filler was not $Cu_4Ti$.

The sealing portions of the vacuum-tight vessels obtained in Example 1 and Comparative Examples 1 and 2 were examined for their shapes and states. The results indicated that each sealing layer 3 in the vacuum-tight vessel in Example 1 was composed of the segregated Ti layer 4 and the main body 5, and had a long-legged shape where L was 10 mm (i.e. 20 T; T is the thickness of said sealing cap) and θ was 30° as shown in FIG. 3. The segregated Ti layer 4 was 2 μm in thickness. In each sealing layer 3, the main body 5 was composed of the fine Ag—Cu eutectic alloy and there was no voids capable of forming leak passages. In the vacuum-tight vessels in Comparative Examples 1 and 2, each sealing layer 11 formed between the open ends of the cylinder 1 and each circle-shaped end of the sealing caps 2 had a bulb-like shape, respectively, as shown in FIG. 5. Note that, each sealing layer 11 constitutes of a segregated Ti layer 12 formed at the side of the open end of the cylinder 1, and an Ag—Cu based main body 13 protruded from the segregated Ti layer 12 to the side of the circle-shaped end of the sealing cap 2.

In each sealing layer in Comparative Example 1, L was 5 mm (i.e. 10 T; L is the thickness of said sealing cap), θ was 100°, and its contact area with the open end of the cylinder was small. In each sealing layer in Comparative Example 2, L was 5.5 mm (i.e. 11 T; T is the thickness of said sealing cap), θ was 110°, and its contact area with the open end of the cylinder was small.

The vacuum-tight vessels in Examples 1 and Comparative Examples 1 and 2 were examined for their vacuum-tight properties. The results indicated that no leaks occurred in the vacuum-tight vessel in Example 1, while the degree of vacuum in the vacuum-tight vessels in Comparative Examples 1 and 2 was reduced due to leaks.

A presence of voids was examined by applying a red paint on the sealing portions in the vacuum-tight vessels in Example 1 and Comparative Examples 1 and 2. The results indicated that no voids occurred in the vacuum-tight vessel in Example 1, while voids occurred in the interface between the alumina cylinder and the sealing layer in the vacuum-tight vessel in Comparative Example 1, and cracks occurred in the interface between the alumina cylinder and the sealing layer in the vacuum-tight vessel in Comparative Example 2.

The sealing caps were pulled off from the vacuum-tight vessels in a direction of axis in Examples 1 and Comparative Examples 1 and 2, and the fractured surfaces of the sealing portions were examined. The results indicated that in the vacuum-tight vessel in Example 1, no voids had occurred in each joint interface between the open ends of the cylinder and the sealing layers, while in the vacuum-tight vessels in Comparative Examples 1 and 2, voids had occurred in each joint interface between the open ends of the cylinder and the sealing layers.

EXAMPLE 2

First, a melt composed of 50.0 mol % Ag, 41.7 mol % Cu, and 8.3 mol % Ti was produced, and this melt was cooled gradually in a desired mold to form a ring-shaped brazing filler of 39 mm in outer diameter, 38.5 mm in inner diameter, and 0.2 mm in thickness, containing the whole of Ti substantially in the form of Ti element and $Cu_4Ti$. The volume ratio of $Cu_4Ti$ in this brazing filler was 33 vol % as determined by evaluation of its section. Note that, the ring-shape brazing filler may be formed by punching a plate constituting of the metal component.

Then, two sealing caps made of SUS 304 and each having circle-shaped end, and 0.5 mm in thickness, 39 mm in outer diameter, and 5 mm in height were prepared. In addition, a cylinder made of 94% purity alumina and having 44 mm in outer diameter, 39 mm in inner diameter, and 52 mm in height was prepared. Subsequently, each circle-shaped end of the sealing caps was placed on the open ends of the cylinder, respectively. Each ring-shaped brazing filler obtained above method was inserted between the open ends of the cylinder and the circle-shaped ends, respectively. Resultant members were introduced into a vacuum furnace which was then evacuated to 6×10⁻⁴Pa, and the temperature was raised to 873° C. at a raising rate of 327° C./hour, and this temperature was kept for 20 minutes, and then the specimen was cooled in the furnace, to manufacture a vacuum-tight vessel comprising the cylinder having the open ends sealed with each circle-shaped end of the sealing caps by each sealing layer, respectively.

The sealing portion of the vacuum-tight vessel obtained in Example 2 was examined for its shape and states. The results indicated that, each sealing layer in the vacuum-tight vessel in Example 2 was composed of the segregated Ti layer 4 and the main body 5 based on the Ag—Cu eutectic alloy, and had a long-legged shape where L was 10 mm (i.e. 20 T; T is the thickness of said sealing cap) and θ was 30° as shown in FIG. 3. The segregated Ti layer 4 was 3 μm in thickness. In each sealing layer 3, the main body 5 was based on the fine Ag—Cu eutectic alloy and there was no voids capable of forming leak passages, although the unmelted Cu—Ti compound was partially present.

The vacuum-tight vessel was examined for its vacuum-tight properties. The result indicated that no leaks occurred in this vacuum-tight vessel. Further, a presence of voids was examined by applying a red paint on each sealing portions in the vacuum-tight vessel. The result indicated that no voids occurred in the vacuum-tight vessel. Further, each sealing cap was pulled off from the vacuum-tight vessel in a direction of axis, respectively, and the fractured surface of each sealing layer was examined. The result indicated that no voids had occurred in each interface between the open ends of the alumina cylinder and the sealing layers.

Another vacuum-tight vessel excellent in hermetic properties and comprising an alumina cylinder having the open ends sealed strongly with each circle-shaped end of a stainless steel sealing caps, respectively, could also be manufactured in the same manner as in Examples 1 and 2, even by use of a brazing filler composed of Ag, Cu and Zr in which the Cu—Zr compound was contained in an amount of not more than 40% by volume or a brazing filler composed of Ag, Cu and Hf in which the Cu—Hf compound was contained in an amount of not more than 40% by volume.

As described above, a brazing filler for sealing vacuum-tight vessels which is excellent in wetting properties towards the open end of an insulating vessel made of ceramic can be provided according to the present invention.

According to the present invention, there can be further provided a vacuum-tight vessel comprising a ceramic cylinder having the open ends sealed with a metal sealing caps, respectively, by each long-legged sealing layer with a segregated layer made of an active metal formed on the surface of the open end.

According to the present invention, there can be further provided a method for manufacturing a vacuum-tight vessel comprising a ceramic cylinder and two metal sealing caps to permit the open ends of the cylinder to be sealed with the sealing caps, respectively, by a thermal treatment at a relatively low temperature with two brazing fillers each having excellent in wetting properties towards the ceramic cylinder, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A brazing filler for sealing vacuum-tight vessels, which comprises Ag, Cu and an active metal in which the Cu-active metal compound is contained in an amount of not more than 40% by volume, wherein the Ag, Cu and active metal are incorporated in a molar ratio of 50 to 59: 33 to 40: 1 to 17.

2. The brazing filler according to claim 1, wherein said active metal is at least one member selected from the group consisting of titanium, zirconium and hafnium.

3. The brazing filler according to claim 1, wherein said Ag and Cu are incorporated into such a ratio as to be converted substantially into the Ag—Cu eutectic alloy at the time of thermal treatment at a temperature exceeding the Ag—Cu eutectic temperature.

4. The brazing filler according to claim 1, wherein said active metal is titanium, and said Cu-active metal compound is at least one member selected from the group consisting of CuTi, Cu₃Ti, Cu₄Ti₃.

5. The brazing filler according to claim 1, wherein said Cu-active metal compound is contained in an amount of 5 to 25% by volume.

6. The brazing filler according to claim 1, wherein said active metal is present in an amount of 3–17 mol %.

7. A method for manufacturing a vacuum-tight vessel comprising:

preparing two sealing caps made of metal, each having frame-shaped end;

arranging said sealing caps to place each said frame-shaped end on the open ends of a cylinder made of ceramic respectively;

inserting two brazing fillers, comprising Ag, Cu and an active metal in which the Cu-active metal compound is contained in an amount of not more than 40% by volume, between the open ends of said cylinder and the frame-shape ends, respectively; and subjecting said brazing fillers to thermal treatment at a temperature exceeding the Ag—Cu eutectic temperature until two segregated layers, made of an active metal, are formed on the surfaces of the open ends of said cylinder in contact with said brazing fillers, respectively, thereby closing the open ends of said cylinder, wherein the Ag, Cu and active metal are incorporated in a molar ratio of 50 to 59: 33 to 40: 1 to 17.

8. The method according to claim 7, wherein said brazing filler is in the form of a thin plate.

9. The method according to claim 7, wherein the active metal in said brazing filler is selected from the group consisting of titanium, zirconium and hafnium.

10. The method according to claim 7, wherein the Ag and Cu in said brazing filler are incorporated into such a ratio to be converted substantially into the Ag—Cu eutectic alloy at the time of the thermal treatment.

11. The method according to claim 7, wherein the active metal in said brazing filler is titanium, and the Cu-active metal compound is Cu₄Ti.

12. The method according to claim 7, wherein said brazing filler comprises 5 to 25% by volume of the Cu-active metal compound.

13. The method according to claim 7, wherein said segregated layer has a thickness of 50 nm or more.

14. The method according to claim 7, wherein in said thermal treatment is performed to be dissolved the whole of said Cu-active metal compound into the melted brazing filler after the formation of said segregated layer.

15. The method according to claim 7, wherein said thermal treatment is carried out in an atmosphere of inert gas or under vacuum.

* * * * *